(12) United States Patent
Kim et al.

(10) Patent No.: US 9,413,236 B2
(45) Date of Patent: Aug. 9, 2016

(54) VOLTAGE CONVERTER

(71) Applicants: SK hynix Inc., Icheon (KR);
INDUSTRY-ACADEMIC COOPERATION FOUNDATION, YONSEI UNIVERSITY, Seoul (KR)

(72) Inventors: Jin-Hyuk Kim, Jeollabuk-do (KR);
Dong-Hoon Jung, Seoul (KR);
Kyung-Ho Ryu, Seoul (KR);
Seong-Ook Jung, Seoul (KR);
Byoung-Chan Oh, Seoul (KR)

(73) Assignees: SK HYNIX INC., Icheon (KR);
INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/571,605

(22) Filed: Dec. 16, 2014

(65) Prior Publication Data

US 2015/0194891 A1 Jul. 9, 2015

(30) Foreign Application Priority Data

Jan. 9, 2014 (KR) .................. 10-2014-0002814

(51) Int. Cl.
*H02M 3/156* (2006.01)
*H02M 1/44* (2007.01)

(52) U.S. Cl.
CPC ............. *H02M 3/156* (2013.01); *H02M 1/44* (2013.01)

(58) Field of Classification Search
CPC ..... H02M 3/156; H02M 3/157; H02M 3/1588
USPC ................... 323/271, 282–285, 351
See application file for complete search history.

(56) References Cited

U.S. PATENT DOCUMENTS

| 2001/0021130 | A1* | 9/2001 | Han | G11C 7/22 365/194 |
|---|---|---|---|---|
| 2001/0028266 | A1* | 10/2001 | Taniguchi | H03L 7/0812 327/276 |
| 2004/0095113 | A1 | 5/2004 | Kernahan et al. | |
| 2006/0038596 | A1* | 2/2006 | Wang | H03M 1/0827 327/158 |
| 2006/0176091 | A1* | 8/2006 | Sakiyama | H03L 7/07 327/158 |
| 2009/0224732 | A1* | 9/2009 | Kudo | H02M 3/1584 323/271 |
| 2012/0249103 | A1* | 10/2012 | Latham, II | H02M 3/158 323/282 |
| 2013/0009617 | A1* | 1/2013 | Xi | H02M 3/156 323/271 |
| 2013/0215655 | A1* | 8/2013 | Yang | H05B 33/0851 363/89 |
| 2014/0340949 | A1* | 11/2014 | Chen | H02M 1/4225 363/44 |
| 2015/0146833 | A1* | 5/2015 | Byun | H03L 7/0802 375/371 |

FOREIGN PATENT DOCUMENTS

KR 10-2012-0090686 A 8/2012

OTHER PUBLICATIONS

Feng Su et al., "Ultra Fast Fixed-Frequency Hysteretic Buck Converter With Maximum Charging Current Control and Adaptive Delay Compensation for DVS Applications", IEEE Journal of Solid-State Circuits, Apr. 2008, pp. 815-822, vol. 43, No. 4, IEEE.

* cited by examiner

*Primary Examiner* — Adolf Berhane (57) ABSTRACT

A voltage converter includes a power supply circuit configured to generate an output voltage based on an input voltage in response to a control signal, and a power supply control circuit configured to generate the control signal based on a reference clock signal and the output voltage.

20 Claims, 8 Drawing Sheets

FIG. 1

<PRIOR ART>

VOLTAGE CONVERTER

CROSS-REFERENCE TO RELATED APPLICATIONS

The present application claims priority to Korean Patent Application No. 10-2014-0002814, filed on Jan. 9, 2014, which is incorporated herein by reference in its entirety.

BACKGROUND

1. Field

Embodiments of the present disclosure relate to a voltage converter, and more particularly, to a voltage converter which controls an output voltage in a digital manner.

2. Description of the Related Art

Figure 1:
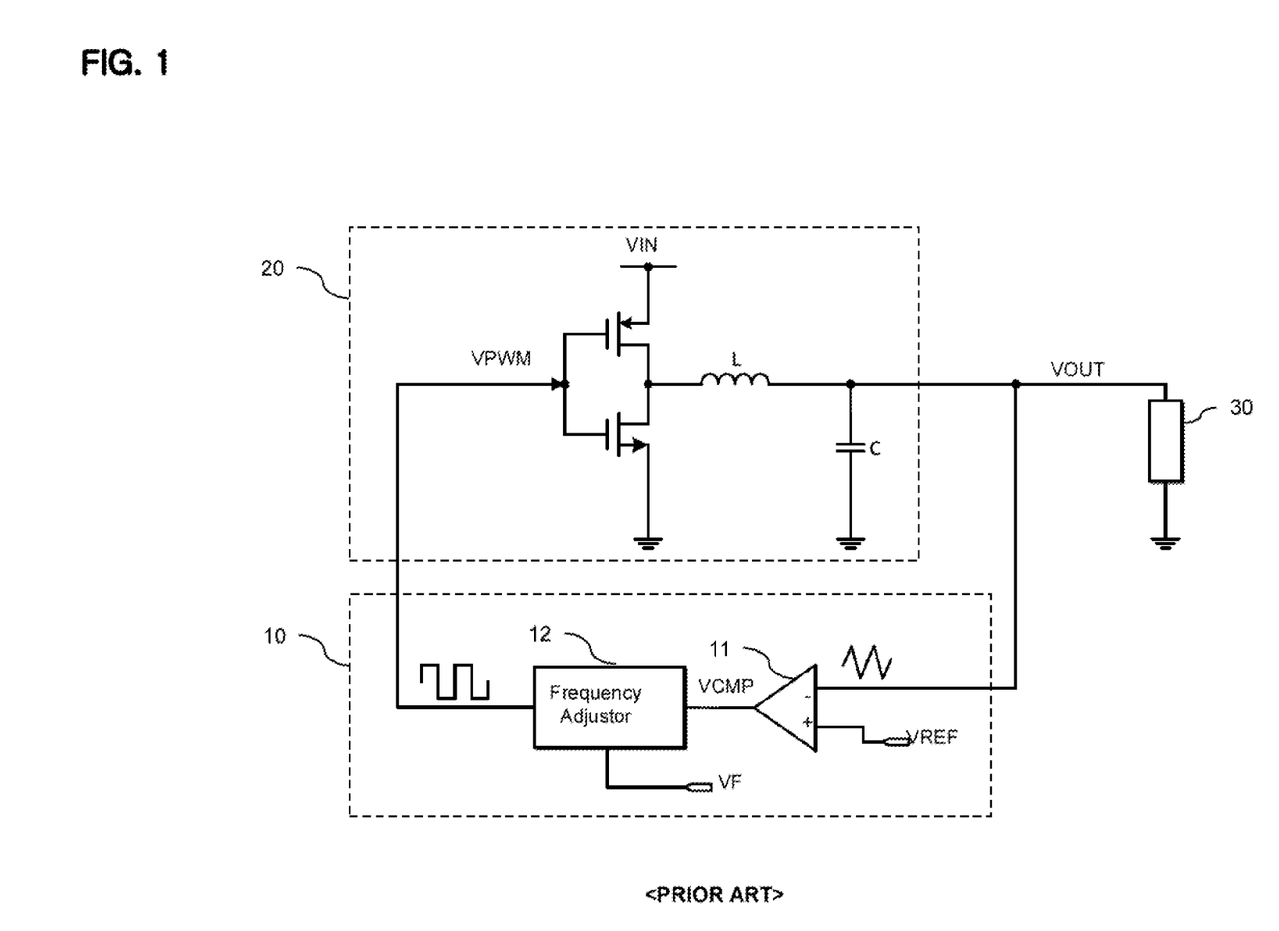
FIG. 1 is a circuit diagram of a conventional voltage converter.

FIG. 1 is a circuit diagram of a conventional voltage converter.

The conventional voltage converter includes a power supply circuit 20 and a power supply control circuit 10. The power supply circuit 20 generates an output voltage VOUT based on an input voltage VIN provided from a power supply such as a battery, and provides the output voltage VOUT to a load circuit 30. The power supply control circuit 10 controls the power supply circuit 20 using the output voltage VOUT that is fed back thereto. That is, the power supply control circuit 10 feedback-controls the power supply circuit 20.

The power supply circuit 20 of FIG. 1 includes a buck converter circuit which is controlled by a control signal VPWM to generate the output voltage VOUT based on the input voltage VIN. The output voltage VOUT of the power supply circuit 20 has a triangular waveform so that a voltage level of the output voltage VOUT oscillates around a reference voltage VREF.

The power supply control circuit 10 includes a comparator 11 and a frequency adjustor 12. The comparator 11 compares the output voltage VOUT to a reference voltage VREF and generates a comparison signal VCMP, and the frequency adjustor 12 adjusts a frequency of the comparison signal VCMP according to the reference signal VF and outputs the control signal VPWM.

In the conventional voltage converter shown in FIG. 1, when the output voltage VOUT changes, the frequency of the control signal VPWM output from the power supply control circuit 10 may be changed and thus electromagnetic interference (EMI) noise may result in a system including the voltage converter.

SUMMARY

Various embodiments are directed to a voltage converter including a power supply control circuit operating in a digital manner. Also, various embodiments are directed to a voltage converter capable of easily adjusting a target voltage level of an output voltage using a digital code. Also, various embodiments are directed to a voltage converter capable of performing a calibration operation in response to a digital code in order to remove influences of a process variation. Also, various embodiments are directed to a voltage converter capable of effectively preventing occurrence of EMI noise through the use of a frequency adjustor operating in a digital manner.

In an embodiment, a voltage converter may include: a power supply unit configured to generate an output voltage from an input voltage according to a control signal; and a power supply control unit configured to feedback-control the control signal according to a reference clock signal and the output voltage.

The power supply control unit may include: a delay controller configured to generate a delayed clock signal according to the reference clock signal and the output voltage; a phase detector configured to generate a clock signal corresponding to a phase difference between the reference clock signal and the delayed clock signal; and a frequency adjustor configured to generate the control signal by constantly adjusting the frequency of the clock signal.

DETAILED DESCRIPTION

Various embodiments will be described below in more detail with reference to the accompanying drawings. The present invention may, however, be embodied in different forms and should not be construed as limited to embodiments set forth herein. Rather, these embodiments are provided so that the present disclosure will be thorough and complete. Throughout the present disclosure, like reference numerals refer to like parts throughout the various figures and embodiments.

Figure 2:
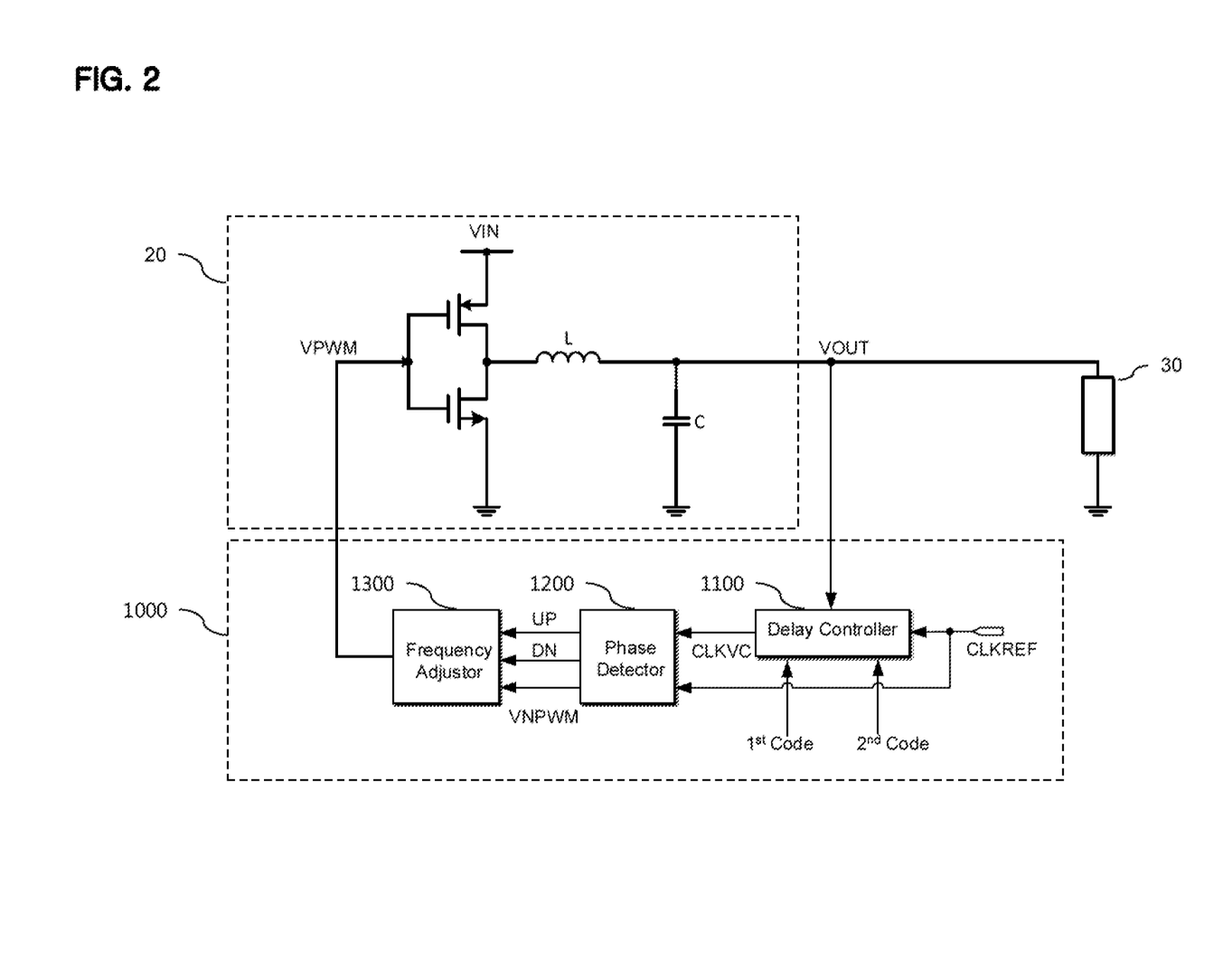
FIG. 2 is a circuit diagram illustrating a voltage converter in accordance with an embodiment of the present disclosure.

FIG. 2 is a circuit diagram illustrating a voltage converter in accordance with an embodiment of the present disclosure.

A voltage converter in accordance with an embodiment of the present disclosure may include a power supply circuit 20 and a power supply control circuit 1000.

The power supply circuit 20 may generate an output voltage VOUT based on an input voltage VIN in response to a control signal VPWM, and provide the generated output voltage VOUT to a load circuit 30. In the present embodiment, a buck converter-type power supply circuit, which is controlled by a pulse width modulation (PWM) control signal VPWM, is taken as an example of the power supply circuit 20. However, the power supply circuit 20 is not limited thereto.

The power supply control circuit 1000 may generate the control signal VPWM based on a reference clock signal CLKREF and the output voltage VOUT, and control the power supply circuit 20 using the control signal VPWM.

The power supply control circuit 1000 may include a delay controller 1100, a phase detector 1200, and a frequency adjustor 1300.

The delay controller 1100 may receive the reference clock signal CLKREF, and output a delayed clock signal CLKVC. The amount of the delay (i.e., the delay amount) of the delayed clock signal CLKVC may be adjusted according to the output voltage VOUT.

The delay amount of the delayed clock signal CLKVC may also be adjusted by a first code or a second code provided from outside the voltage converter. The first code may be used for setting a target voltage level of the output voltage VOUT, and the second code may be used for calibrating the delay controller 1100. The calibration is performed to offset influences caused by process variations, and will be described below in more detail.

A configuration and an operation of a delay controller 1100 in accordance with an embodiment will be described with reference to FIG. 3.

Figure 3:
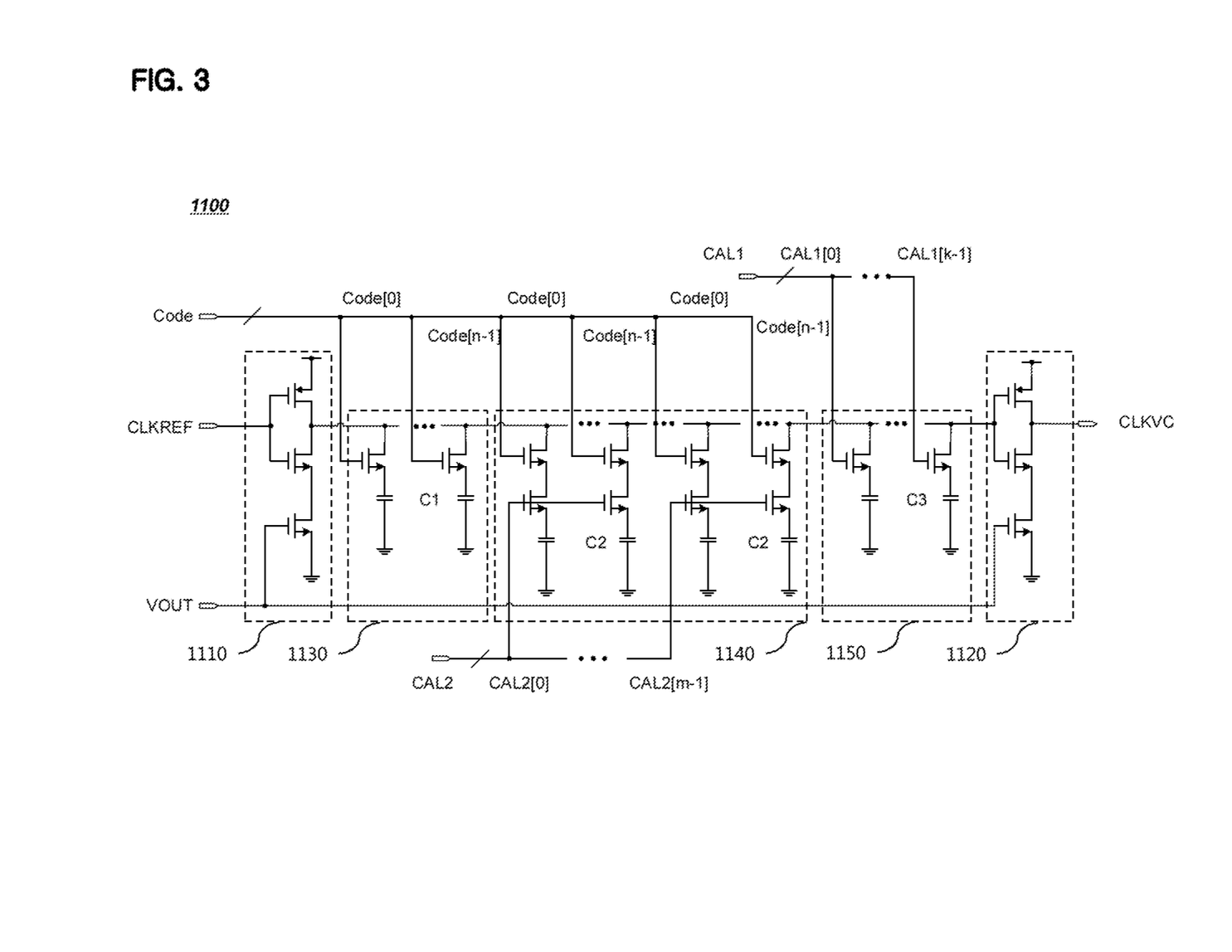
FIG. 3 is a circuit diagram of a delay controller of FIG. 2 in accordance with an embodiment of the present disclosure.

As illustrated in FIG. 3, the delay controller 1100 may include inverting circuits 1110 and 1120. The delay controller 1100 may further include a first delay control section 1130, a second delay control section 1140, and a third delay control section 1150, which are coupled to and disposed in parallel between the inverting circuits 1110 and 1120.

Each of the first to third delay control sections 1130, 1140, and 1150 may include a plurality of switches and a plurality of capacitors coupled to the plurality of switches, respectively. In an embodiment, the switches may be implemented using NMOS transistors.

A first code Code or a second code may be inputted to the switches. In the present embodiment, the second code may include a first calibration code CAL1 and a second calibration code CAL2. Each of the first code Code, the first calibration code CAL1 and the second calibration code CAL2 may include multiple bits.

In the present embodiment, the first code Code may be inputted to the switches in the first delay control section 1130, and the first calibration code CAL1 may be inputted to the switches in the third delay control section 1150. The second delay control section 1140 may include two switches coupled in series to each other and coupled to a corresponding capacitor, and the two switches receive the first code Code and the second calibration code CAL2, respectively.

When the first code Code and the second codes CAL1 and CAL2 are at a low level, all of the switches included in the first to third delay control sections 1130, 1140, and 1150 may be turned off. Thus, the delay controller 1100 may delay the reference clock signal CLKREF according to a delay amount of the inverting circuits 1110 and 1120, and output the delayed clock signal CLKVC.

In this embodiment, each of the inverting circuits 1110 and 1120 may include a PMOS transistor and a first NMOS transistor, which are coupled in series to each other and controlled by the reference clock signal CLKREF, and a second NMOS transistor coupled to and disposed between a source terminal of the first NMOS transistor and a ground voltage terminal and controlled by the output voltage VOUT.

Figure 4:
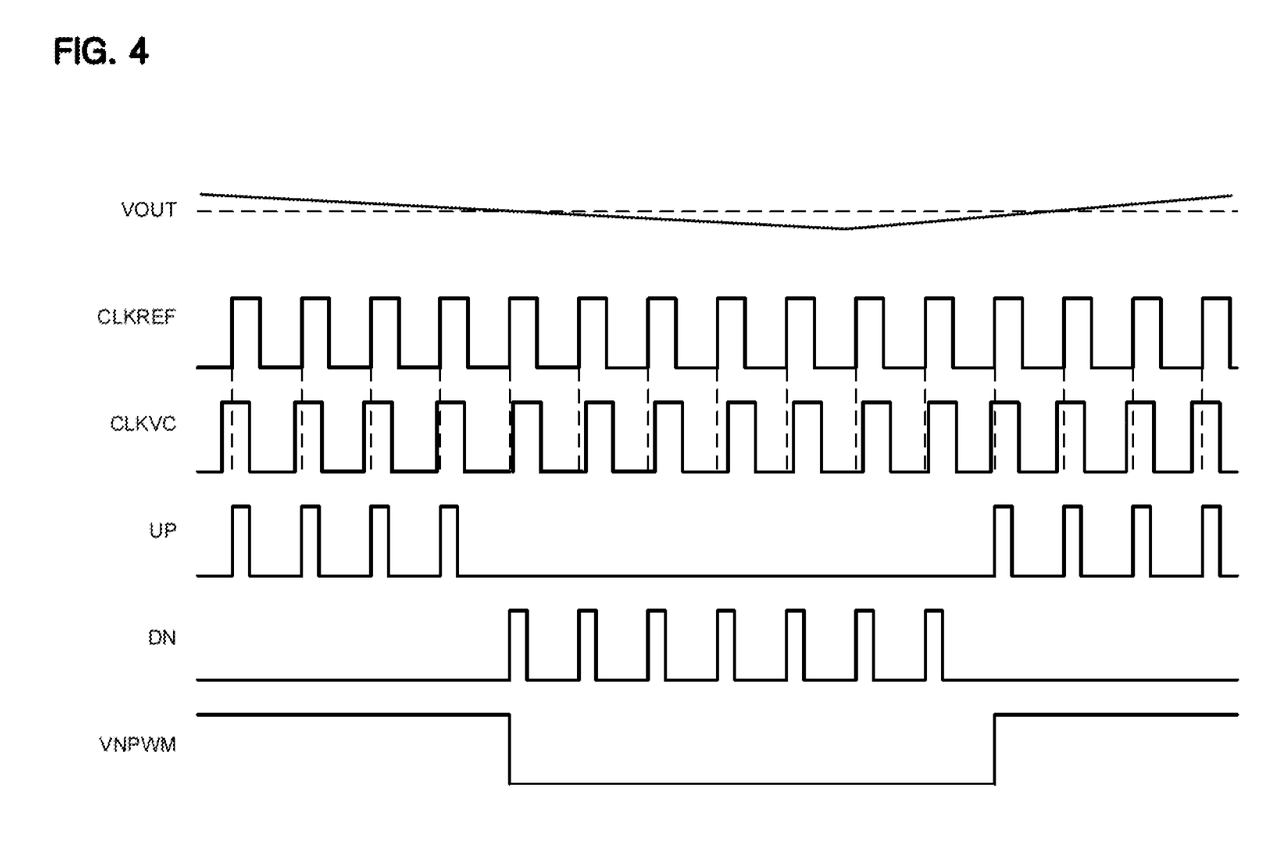
FIG. 4 is a waveform diagram illustrating operations of the delay controller and a phase detector of FIG. 2 in accordance with an embodiment of the present disclosure.

At this time, a bias current flowing in the inverting circuits 1110 and 1120 may be controlled by the output voltage VOUT. If a voltage level of the output voltage VOUT increases, the bias current may increase and thus a switching speed of the inverting circuits 1110 and 1120 also increases. As a result, the delay amount of the inverting circuits 1110 and 1120 may be reduced. On the other hand, if the voltage level of the output voltage VOUT is reduced, the switching speed of the inverting circuits 1110 and 1120 is also reduced, and thus the delay amount of the inverting circuits 1110 and 1120 may be increased. FIG. 4 illustrates the relationship between the voltage level of the output voltage VOUT and the delay amount of the delayed clock signal CLKVC.

The first code Code is a digital code corresponding to the target voltage level of the output voltage VOUT. For example, when the output voltage VOUT is designed to be in a range from 0.5V to 1V, the first code Code may be set to have a bit value of 0 to $2^n-1$, n being a positive integer. Thus, the bit value of the first code Code may be adjusted to arbitrarily control the output voltage VOUT to be in the range of the target voltage level. In the embodiment shown in FIG. 3, when the first code Code has the bit value of 0 to $2^n-1$, n bits of the first code Code are respectively applied to corresponding switches in the first and second delay control sections 1130 and 1140.

The second codes CAL1 and CAL2 have digital values used for calibrating the delay controller 1100. In the embodiment shown in FIG. 3, the first calibration code CAL1 may be set to have a bit value of 0 to $2^k-1$, k being a positive integer, and the second calibration code CAL2 may be set to have a bit value of 0 to $2^m-1$, m being a positive integer. Thus, k bits of the first calibration code CAL1 are respectively applied to the switches in the third delay control section 1150, and m bits of the second calibration code CAL2 are respectively applied to corresponding switches in the second delay control section 1140.

Even when chips are fabricated through the same process, the chips may have different operational characteristics due to unintended process variations. Thus, although the first code Code having the same bit value is inputted, the target voltage level of the output voltage VOUT may change depending on the circuit.

In order to address this issue, a calibration operation may be performed. In an embodiment of the present disclosure, a calibration operation may be performed in the following order.

First, the smallest value in the range of the target voltage level of the output voltage VOUT may be inputted as the output voltage VOUT, and the first code Code having a bit value 'zero' may be inputted. Then, the value of the first calibration code CAL1 may be adjusted to equalize the delay amount of the delay controller 1100 to a period TREF of the reference clock signal CLKREF.

After that, the largest value in the range of the target voltage level of the output voltage VOUT may be inputted as the output voltage VOUT, and the first code Code having a bit value '$2^n-1$' may be inputted. Then, the value of the second calibration code CAL2 may be adjusted to equalize the delay amount of the delay controller 1100 to the period TREF of the reference clock signal CLKREF.

When the calibration operation is completed, the value of the second code CAL1 or CAL2 may be fixed, and the delay amount of the delay controller 1100 may be changed according to the voltage level of the output voltage VOUT or the bit value of the first code Code.

In FIG. 2, the phase detector 1200 may compare the delayed clock signal CLKVC to the reference clock signal CLKREF, and output clock signals corresponding to a phase difference between the two clock signals CLKVC and CLKREF. The clock signals may include a first signal UP, a second signal DN, and a third signal VNPWM. Characteristics of clock signals outputted from the phase detector 1200 will be described with reference to FIG. 4.

In FIG. 2, when the voltage level of the output voltage VOUT drops, the bias current flowing in the inverting circuits 1110 and 1120 may decrease to lower the switching speed of the inverting circuits 1110 and 1120. Thus, the delay amount of the inverting circuits 1110 and 1120 may be increased.

Referring to FIG. 4, as the voltage level of the output voltage VOUT decreases, the phase of the delay clock signal CLKVC may be slower. On the other hand, as the voltage level of the output voltage VOUT increases, the phase of the delay clock signal CLKVC may be faster.

The first signal UP and the second signal DN may be generated according to a phase difference between the reference clock signal CLKREF and the delayed clock signal CLKVC.

As illustrated in FIG. 4, the first signal UP is a pulse signal which is generated when the phase of the delayed clock signal CLKVC leads the phase of the reference clock signal CLKREF, and the second signal DN is a pulse signal which is generated when the phase of the reference clock signal CLKREF leads the phase of the delayed clock signal CLKVC. The first and second signals UP and DN may be generated in synchronization with the reference clock signal CLKREF.

Furthermore, the third signal VNPWM may maintain a high level while the first signal UP continues to be generated, transition to a low level when the second signal DN starts to be generated, and maintain the low level while the second signal DN continues to be generated. Then, when the first signal UP starts again, the third signal VNPWM may transition to the high level and maintain the high level while the first signal UP continues to be generated.

A frequency of the third signal VNPWM may be changed according to a changing speed of the voltage level of the output voltage VOUT. For example, if the voltage level of the output voltage VOUT changes quickly, the third signal VNPWM may have a high frequency. On the other hand, if the voltage level of the output voltage VOUT changes slowly, the third signal VNPWM may have a low frequency.

Figure 5:
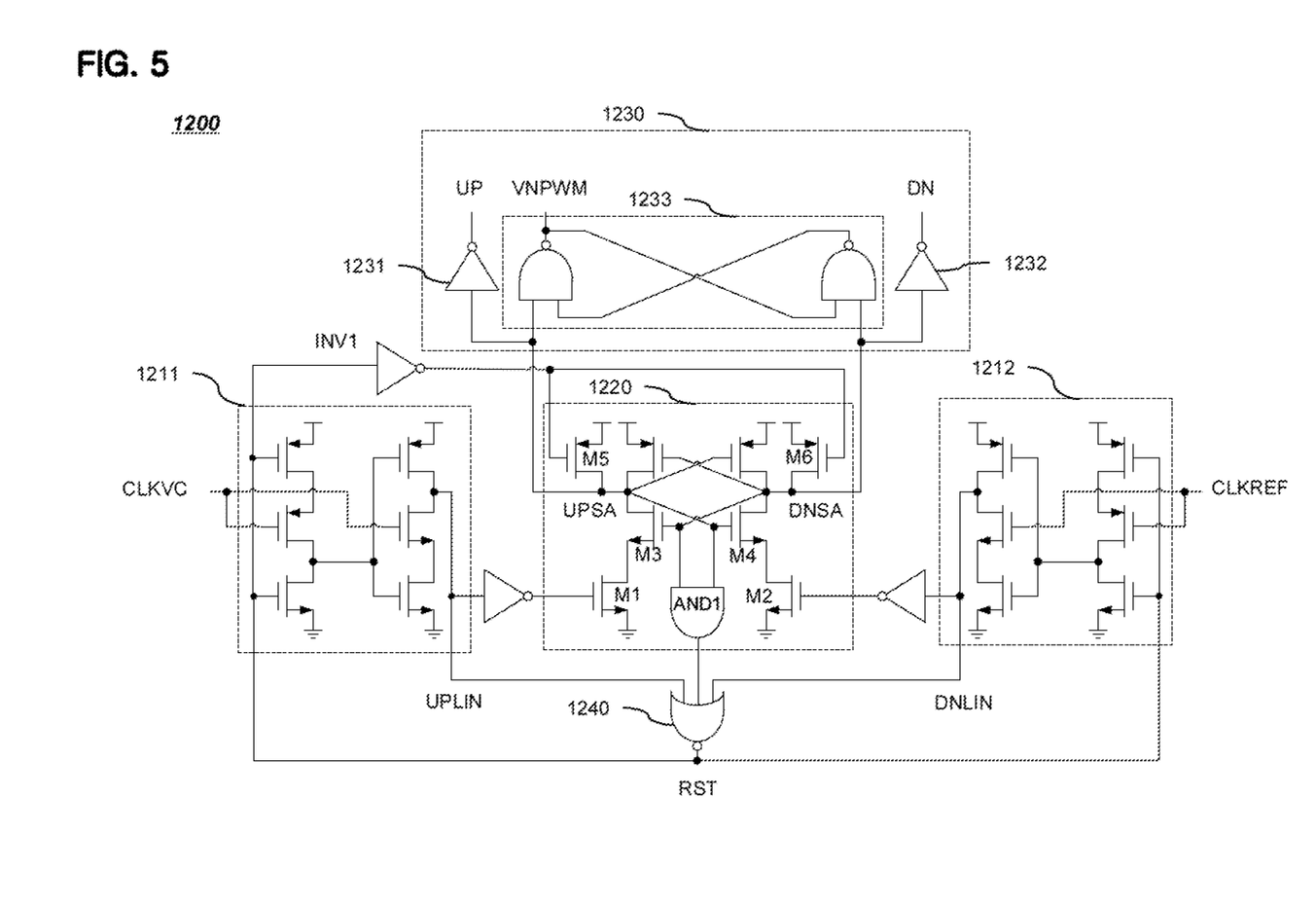
FIG. 5 is a circuit diagram of a phase detector of FIG. 2 in accordance with an embodiment of the present disclosure.

FIG. 5 is a circuit diagram of the phase detector 1200 of FIG. 2 in accordance with an embodiment of the present disclosure.

The phase detector 1200 may include edge detection sections 1211 and 1212, an amplification section 1220, a signal generation section 1230, and a reset section 1240.

The edge detection sections 1211 and 1212 may detect rising edges or falling edges of the delayed clock signal CLKVC and the reference clock signal CLKREF, respectively, and output a first phase signal UPLIN and a second phase signal DNLIN, respectively.

The amplification section 1220 may amplify a difference between the first and second phase signals UPLIN and DNLIN, and output first and second amplified signals UPSA and DNSA.

The signal generation section 1230 may output the first signal UP by inverting the first amplified signal UPSA, output the second signal DN by inverting the second amplified signal DNSA, and output the third signal VNPWM by latching the first and second amplified signals UPSA and DNSA.

The reset section 1240 may generate a reset signal RST to reset the first and second amplified signals UPSA and DNSA after the amplification operation of the amplification circuit 1220 is completed.

Hereafter, an operation of a phase detector 1200 of FIG. 5 will be described with reference to a waveform diagram of FIG. 6.

At an initial stage of the operation, the reference clock signal CLKREF and the delayed clock signal CLKVC may be reset to a low level, the first phase signal UPLIN and the second phase signal DNLIN may be reset to a high level, and the first amplified signal UPSA and the second amplified signal DNSA may also be reset to a high level. After the reset operation is performed, the reset signal RST may have a low level. At the initial stage, the reference clock signal CLKREF and the delayed clock signal CLKVC may have a low level.

Figure 6:
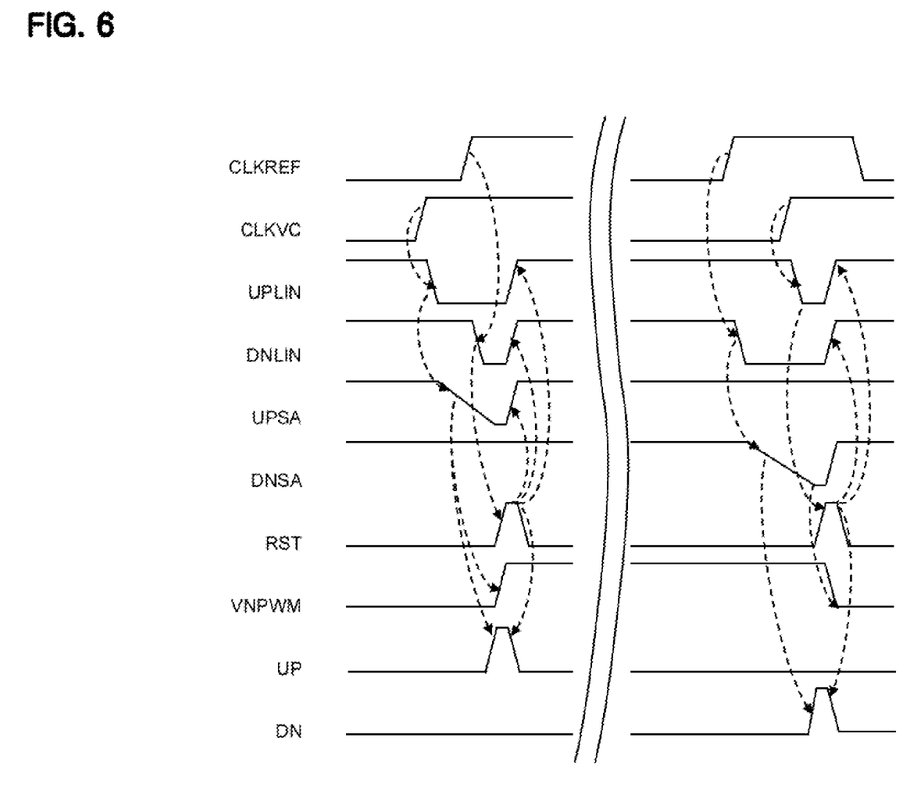
FIG. 6 is a waveform diagram illustrating an operation of a phase detector of FIG. 5 in accordance with an embodiment of the present disclosure.

As shown on the left side of FIG. 6, the delayed clock signal CLKVC transitions from the initial low level to a high level in a state where the reference clock signal CLKREF is at a low level. That is, the phase of the reference clock signal CLKREF lags behind the phase of the delayed clock signal CLKVC.

At a rising edge of the delayed clock signal CLKVC, the first phase signal UPLIN may transition from an initial high level to a low level according to an operation of the edge detection section 1211. Since the reference clock signal CLKREF maintains an initial low level at the rising edge of the delayed clock signal CLKVC, the second phase signal DNLIN may be at an initial high level when the delayed clock signal CLKVC transitions to a high level. The amplification section 1220 may amplify a difference between the first and second phase signals UPLIN and DNLIN. Thus, a voltage level of the first amplified signal UPSA may gradually decrease since NMOS transistors M1 and M3 in the amplification section 1220 are turned on in response to the first phase signal UPLIN changing to a low level and the second amplified signal DNSA being at an initial high level, respectively.

When the voltage level of the first amplified signal UPSA sufficiently falls and thus the first amplified signal UPSA is determined to be at a low level, the first signal UP outputted from an inverter 1231 may transition from an initial low level to a high level, and the third signal VNPWM may transition from an initial low level to a high level according to the operation of a latch 1233.

At this time, if the reference clock signal CLKREF transitions from the initial low level to a high level, the second phase signal DNLIN may transition from an initial high level to a low level. As the second phase signal DNLIN transitions to the low level, an output of the reset section 1240, i.e., the reset signal RST, may transition from a low level to a high level in response to the first phase signal UPLIN being at a low level, the second phase signal DNLIN being at a low level, and an output signal of an AND gate AND1 in the amplification section 1220 being at a low level. At this time, the output signal of the AND gate AND1 is determined to be at a low level based on a voltage level of the first amplified signal UPSA that gradually decreases.

As the reset signal RST transitions to a high level, an output of an inverter INV1 has a low level. Accordingly, PMOS transistors M5 and M6 in the amplification section 1220 are turned on in response to the output of the inverter INV1. As a result, the first and second amplified signals UPSA and DNSA may rise to a high level. While the reset signal RST is at a high level, the first and second phase signals UPLIN and DNLIN may also rise to a high level in response to a reset operation of the high level of the reset signal RST on the edge detection sections 1211 and 1212. As the first and second amplified signals UPSA and DNSA and the first and second phase signals UPLIN and DNLIN transition to a high level, the reset signal RST returns to a low level after a period corresponding to the shorter one of the delay amount of the inverter INV1 and the delay amount of the edge detection section 1211 or 1212.

Since the delayed clock signal CLKVC transitions to a high level prior to the reference clock signal CLKREF and thus the first amplified signal UPSA transitions to a low level, an NMOS transistor M4 in the amplification section 1220 is turned off. As a result, the second amplified signal DNSA maintains a high level without transitioning to a low level during this operation, as shown on the left side of FIG. 6.

As the first amplified signal UPSA transitions to a high level again, the first signal UP may fall to a low level again. As described above, since a falling edge and a rising edge of the first amplified signal UPSA are formed in synchronization with the delayed clock signal CLKVC and the reference clock signal CLKREF, respectively, a rising edge of the first signal UP may be formed in synchronization with the delayed clock signal CLKVC, and a falling edge of the first signal UP may be formed in synchronization with the reference clock signal CLKREF. Meanwhile, the second signal DN may maintain a low level during this operation in response to the second amplified signal DNSA maintaining a high level without transitioning to a low level.

Next, as shown on the right side of FIG. 6, if the reference clock signal CLKREF rises to a high level in a state where the delayed clock signal CLKVC is at a low level, that is, the phase of the reference clock signal CLKREF leads the phase of the delayed clock signal CLKVC, at a rising edge of the reference clock signal CLKREF, the second phase signal DNLIN may transition from a high level to a low level according to an operation of the edge detection section 1212. At this time, since the delayed clock signal CLKVC maintains the low level, the first phase signal UPLIN may be at a high level. The amplification section 1220 may amplify a difference between the first phase signal UPLIN and the second phase signal DNLIN. Thus, a voltage level of the second amplified signal DNSA may gradually decrease since NMOS transistors M2 and M4 in the amplification section 1220 are turned on in response to the second phase signal DNLIN being at a low level and the first amplified signal UPSA being at a high level, respectively.

When the voltage level of the second amplified signal DNSA sufficiently falls and thus the second amplified signal DNSA is determined to be at a low level, the second signal DN outputted from an inverter 1232 may transition from a low level to a high level, and the third signal VNPWM may transition from a high level to a low level according to the operation of the latch 1233.

At this time, if the delayed clock signal CLKVC transitions from a low level to a high level, the first phase signal UPLIN may transition from a high level to a low level. As the first phase signal UPLIN changes to the low level, an output of the reset section 1240, i.e., the reset signal RST, may transition from a low level to a high level in response to the first phase signal UPLIN being at a low level, the second phase signal DNLIN being at a low level, and the output signal of the AND gate AND1 in the amplification section 1220 being at a low level. At this time, the output signal of the AND gate AND1 is determined is determined to be at a low level based on a voltage level of the second amplified signal DNSA that gradually decreases.

As the reset signal RST transitions to a high level, the output of the inverter INV1 has a low level. Accordingly, the PMOS transistors M5 and M6 in the amplification section 1220 are turned on in response to the output of the inverter INV1. As a result, the first and second amplified signals UPSA and DNSA may rise to a high level. While the reset signal RST is at a high level, the first and second phase signals UPLIN and DNLIN may rise to a high level in response to a reset operation of the high level of the reset signal RST on the edge detection sections 1211 and 1212. As the first and second amplified signals UPSA and DNSA and the first and second phase signals UPLIN and DNLIN transition to a high level, the reset signal RST returns to a low level after a period corresponding to the shorter of the delay amount of the inverter INV1 or the delay amount of the edge detection section 1211 or 1212.

Since the reference clock signal CLKREF transitions to a high level prior to the delayed clock signal CLKVC and thus the second amplified signal DNSA transitions to a low level, the NMOS transistor M3 in the amplification section 1220 is turned off. As a result, the first amplified signal UPSA maintains a high level without transitioning to a low level during this operation, as shown on the right side of FIG. 6. As the second amplified signal DNSA transitions to a high level, the second signal DN may fall to a low level again.

As described above, since a falling edge and a rising edge of the second amplified signal DNSA are formed in synchronization with the reference clock signal CLKREF and the delayed clock signal CLKVC, respectively, a rising edge of the second signal DN may be formed in synchronization with the reference clock signal CLKREF, and a falling edge of the second signal DN may be formed in synchronization with the delayed clock signal CLKVC. Meanwhile, the first signal UP may maintain a low level during this operation in response to the first amplified signal UPSA maintaining a high level without transitioning to a low level.

Referring back to FIG. 2, the frequency adjustor 1300 may constantly adjust a frequency of the third signal VNPWM outputted from the phase detector 1200, and output the adjusted signal as the control signal VPWM for controlling the power supply circuit 20.

A configuration and an operation of a frequency adjustor 1300 in accordance with an embodiment will be described in more detail with reference to FIG. 7.

Figure 7:
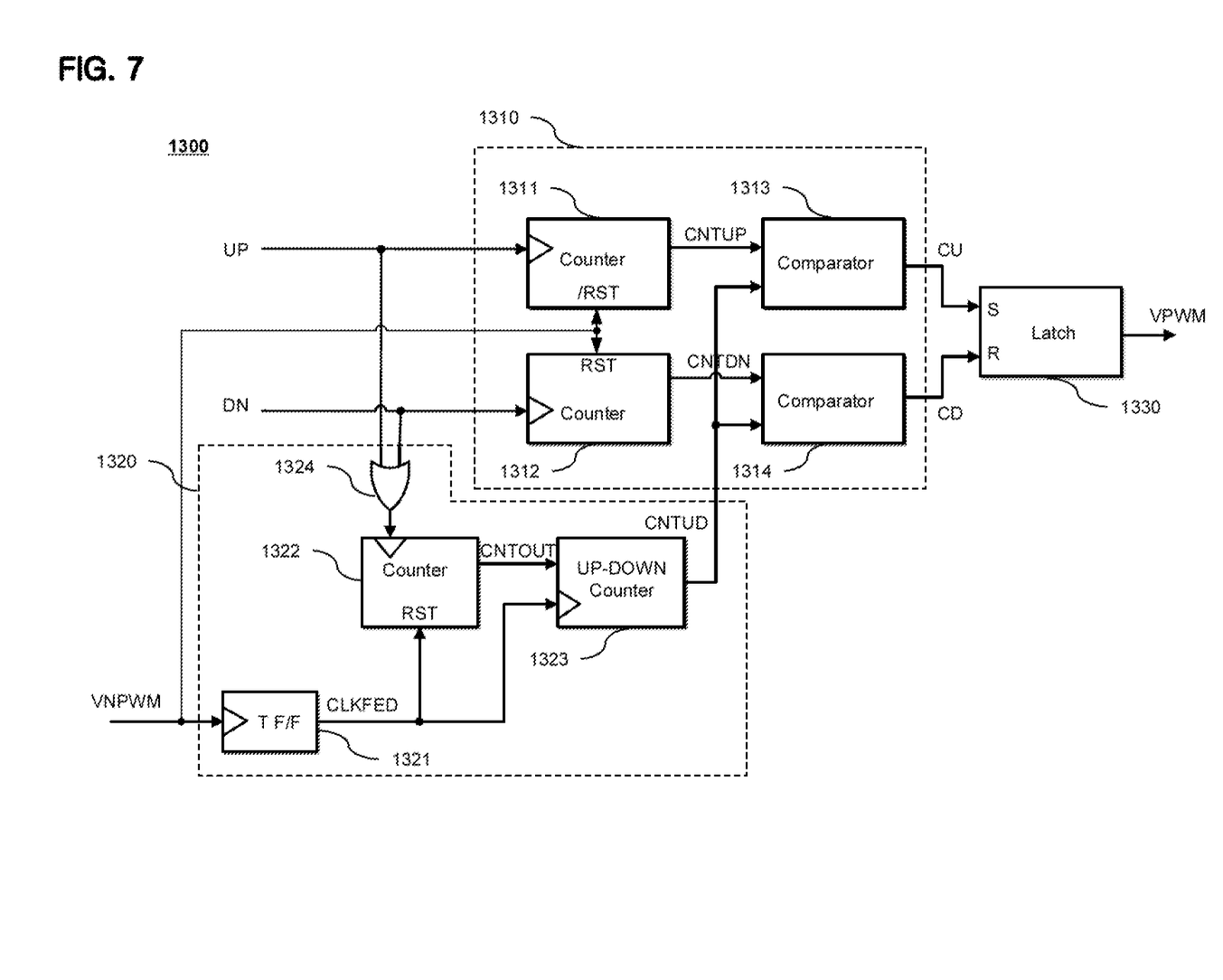
FIG. 7 is a block diagram of a frequency adjustor of FIG. 2 in accordance with an embodiment of the present disclosure.

FIG. 7 is a block diagram illustrating a configuration of a frequency adjustor 1300 in accordance with an embodiment of the present disclosure.

The frequency adjustor 1300 may constantly adjust the frequency of the clock signal VNPWM outputted from the phase detector 1200, and output the control signal VPWM. More specifically, the frequency adjustor 1300 may generate the control signal VPWM having a frequency that is constantly adjusted using the first signal UP, the second signal DN, and the third signal VNPWM.

In the present embodiment, the frequency adjustor 1300 may include a delay addition section 1310, a frequency error detection section 1320, and a signal synthesis section 1330.

The delay addition section 1310 may include first and second counters 1311 and 1312 and first and second comparators 1313 and 1314.

The first counter 1311 may be reset while the third signal VNPWM is at a low level, and output a first count signal CNTUP by counting the number of pulses of the first signal UP while the third signal VNPWM is at a high level. That is, the first count signal CNTUP may correspond to the number of pulses of the first signal UP while the first signal VNPWM is at a high level.

The second counter 1312 may be reset while the third signal VNPWM is at a high level, and output a second count signal CNTDN by counting the number of pulses of the second signal DN while the third signal VNPWM is at a low level.

The first comparator 1313 may compare the first count signal CNTUP to a fourth count signal CNTUD output from the frequency error detection section 1320, and output a first pulse signal CU when a value of the first count signal CNTUP is equal to a value of the fourth count signal CNTUD.

The second comparator 1314 may compare the second count signal CNTDN to the fourth count signal CNTUD, and output a second pulse signal CD when a value of the second count signal CNTDN is equal to the value of the fourth count signal CNTUD.

In the present embodiment, the signal synthesis section 1330 may be implemented with an SR latch, and generate the control signal VPWM. A rising edge of the control signal VPWM is generated according to a pulse of the first pulse signal CU and a falling edge is generated according to a pulse of the second pulse signal CD.

The value of the fourth count signal CNTUD may be related to the time at which the pulses of the first and second pulse signals CU and CD are generated, thereby affecting a period of the control signal VPWM.

The frequency error detection section 1320 may include a flip-flop 1321, a third counter 1322, and an up-down counter 1323.

The flip-flop 1321 may output a frequency detection clock signal CLKFED which has a high level during one period of the third signal VNPWM and has a low level during the next period of the third signal VNPWM. That is, a period of the frequency detection clock signal CLKFED is two times longer than the period of the third signal VNPWM.

The third counter 1322 may be triggered and operate in response to an output of an OR gate 1324, which performs an OR operation on the first signal UP and the second signal DN. The third counter 1322 may be reset when the frequency detection clock signal CLKFED is at a high level, and perform a counting operation when the frequency detection clock signal CLKFED is at a low level.

That is, the third counter 1322 may count the number of pulses of the first and second signals UP and DN in a period when the frequency detection clock signal CLKFED is at a low level, and output a third count signal CNTOUT corresponding to the number of counted pulses of the first signal and the second signal.

As described above with reference to FIG. 6, each of the pulses of the first and second signals UP and DN are formed in synchronization with the reference clock signal CLKREF or the delayed clock signal CLKVC. Thus, an interval between the pulses of the first or second signal UP or DN may have a fixed value determined according to a period of the delayed clock signal CLKVC or the reference clock signal CLKREF.

Thus, when the third count signal CNTOUT has a relatively large value, it may indicate that the third signal VNPWM has a relatively long period, and when the third count signal CNTOUT has a relatively small value, it may indicate that the third signal VNPWM has a relatively short period.

The up-down counter 1323 may increase or decrease a value of the fourth count signal CNTUD according to the third count signal CNTOUT at each period of the delay detection clock signal CLKFED, and output the fourth count signal CNTUD having the increased or decreased value.

If the third count signal CNTOUT has a value equal to or greater than a predetermined reference value, the up-down counter 1323 may decrease the value of the fourth count signal CNTUD. Thus, the time at which the pulses of the first and second pulse signals CU and CD are generated by the first and second comparators 1313 and 1314 of the delay addition section 1310 may be advanced to decrease the period of the control signal VPWM outputted from the signal synthesis section 1330.

On the other hand, if the third count signal CNTOUT has a value less than the predetermined reference value, the up-down counter 1323 may increase the value of the fourth count signal CNTUD. Thus, the time at which the pulses of the first and second pulse signals CU and CD are generated by the first and second comparators 1313 and 1314 may be delayed to increase the period of the control signal VPWM outputted from the signal synthesis section 1330.

Through such an adjusting operation described above, the frequency of the control signal VPWM may converge to a constant value.

Figure 8:
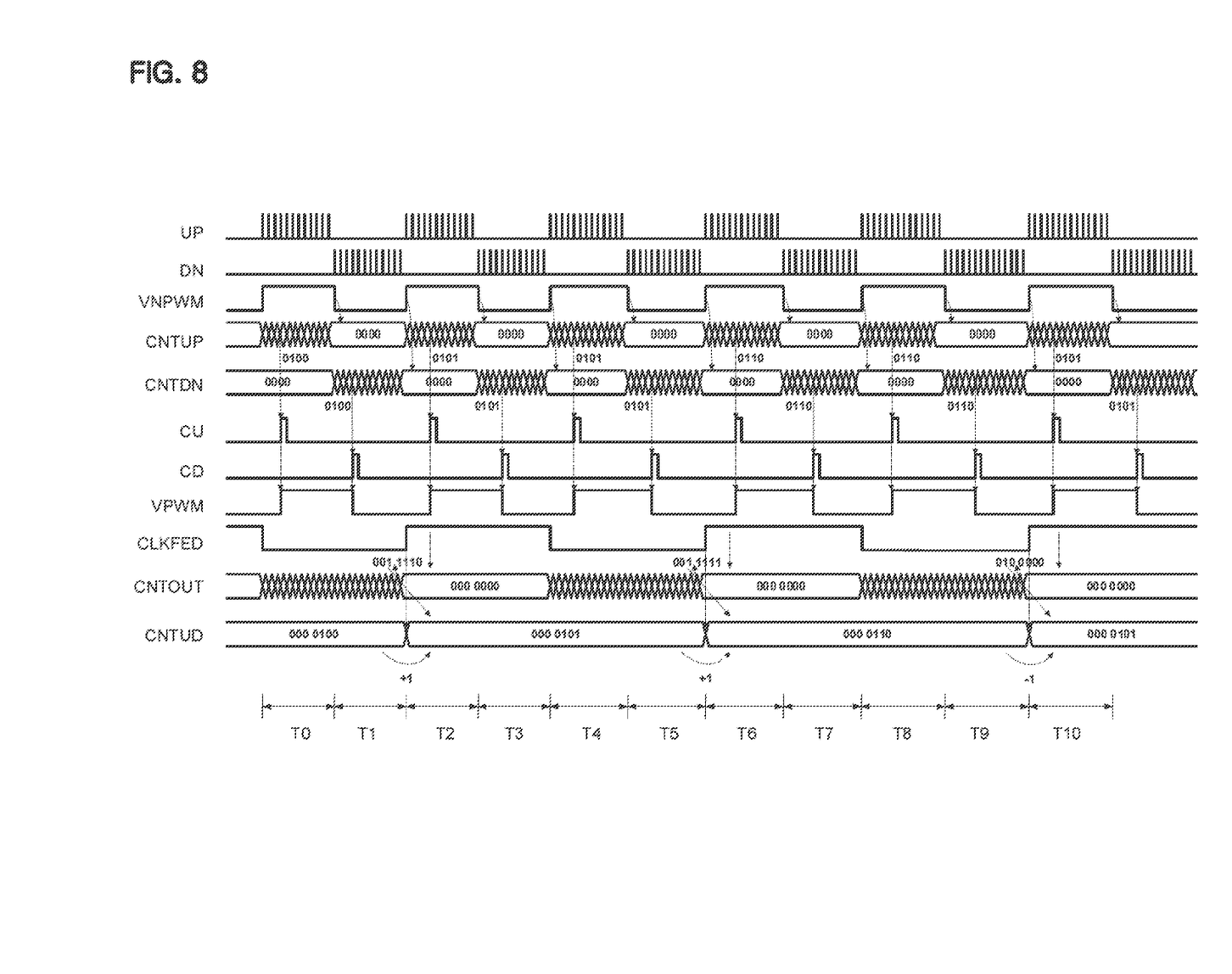
FIG. 8 is a waveform diagram illustrating an operation of a frequency adjustor of FIG. 7 in accordance with an embodiment of the present disclosure.

FIG. 8 is a waveform diagram illustrating an operation of a frequency adjustor 1300 of FIG. 7 in accordance with an embodiment of the present disclosure.

As shown in the waveform diagram of FIG. 8, the up-down counter 1323 may decrease the value of the fourth count signal CNTUD by 1 when the third count signal CNTOUT has a value equal to or greater than a predetermined reference value, e.g., "10 0000", and increase the value of the fourth count signal CNTUD by 1 when the third count signal CNTOUT has a value less than "10 0000".

In FIG. 8, an initial value of the fourth count signal CNTUD may be set. For example, in an embodiment, the initial value of the fourth count signal CNTUD may be set to "100". The initial value of the fourth count signal CNTUD may be set to a smaller value than the number of pulses of the first and second signals UP and DN, which exist in each period, e.g., T0 or T1.

When the output value CNTUP of the first counter 1311 becomes "100" at the period T0, a pulse may be generated in the first pulse signal CU, and when the output value CNTDN of the second counter 1312 becomes "100" at the period T1, a pulse may be generated in the second pulse signal CD. This is because a pulse is generated in the first or second pulse signal CU or CD when the value CNTUP or CNTDN is equal to the value of the fourth count signal CNTUD.

In FIG. 8, the third counter 1322 may count the pulses of the first and second signals UP and DN during the periods T0 and T1.

As the counting result of the third counter 1322, the third count signal CNTOUT having a value "01 1110", which is less than "10 0000", is outputted. Thus, the value of the fourth count signal CNTUD output from the up-down counter 1323 may be updated from "100" to "101" in a period T2 where the frequency detection clock signal CLKFED is at a high level.

After the value of the fourth count signal CNTUD is changed to "101," when the output value CNTUP of the first counter 1311 becomes "101" at the period T2, a pulse may be generated in the first pulse signal CU, and when the output value CNTDN of the second counter 1312 becomes "101" at a period T3, a pulse may be generated in the second pulse signal CD.

During periods T2 and T3, the frequency detection clock signal CLKFED may be at a high level, and thus the third counter 1322 may maintain a reset state. While the third counter 1322 is in the reset state, the fourth count signal CNTUD maintains its previous value, e.g., "101".

In the following periods, the operation may be performed in a similar manner as described above.

At periods T4 and T5, as a counting result of the third counter 1322, the third count signal CNTOUT has a value "01 1111" which is less than "10 0000". Thus, the up-down counter 1323 may increase the value of the fourth count signal CNTUD by 1. Therefore, in the embodiment illustrated in FIG. 8, the fourth count signal CNTUD has an increased value of "110."

At periods T6 and T8, the first comparator 1313 may compare the output value CNTUP of the first counter 1311 to the value "110" of the fourth count signal CNTUD, and output the first pulse signal CU. At periods T7 and T9, the second comparator 1324 may compare the output value CNTDN of the second counter 1312 to the value "110" of the fourth count signal CNTUD, and output the second pulse signal CD.

At periods T8 and T9, as a counting result of the third counter 1322, the third count signal CNTOUT has a value "10 0000" which is equal to "10 0000". Thus, the up-down counter 1323 may decrease the value of the fourth count value CNTUD by 1. Therefore, in the embodiment illustrated in FIG. 8, the fourth count signal CNTUD has a decreased value of "101."

At period T10, the first comparator 1313 may compare the output value CNTUP of the first counter 1311 to the value "101" of the fourth count signal CNTUD, and output the first pulse signal CU.

In accordance with embodiments of the present disclosure, a voltage converter may reduce the occurrence of EMI noise using a frequency adjustor operating in a digital manner. Furthermore, a voltage converter may easily change a target voltage level of an output voltage according to a digital code provided from outside. Furthermore, a voltage converter may perform a calibration operation for reducing the influences of process variations, according to a digital code.

Although various embodiments have been described for illustrative purposes, it will be apparent to those skilled in the art that various changes and modifications may be made without departing from the spirit and scope of the invention as defined in the following claims.

What is claimed is:

1. A voltage converter comprising:
    a power supply circuit configured to generate an output voltage based on an input voltage in response to a control signal; and
    a power supply control circuit configured to generate the control signal based on a reference clock signal and a delayed clock signal, the delayed clock signal being generated by delaying the reference clock signal based on the output voltage and a first code.

2. The voltage converter of claim 1, wherein the power supply control circuit comprises:
    a delay controller configured to generate the delayed clock signal by delaying the reference clock signal based on the output voltage and the first code;
    a phase detector configured to generate a clock signal corresponding to a phase difference between the reference clock signal and the delayed clock signal; and
    a frequency adjustor configured to generate the control signal by constantly adjusting a frequency of the clock signal.

3. The voltage converter of claim 2, wherein the delay controller adjusts a delay amount of the delayed clock signal in response to the first code, and
    wherein a target voltage level of the output voltage is adjusted according to a change in a value of the first code.

4. The voltage converter of claim 3, wherein the delay controller further adjusts the delay amount of the delayed clock signal according to a second code, and
    wherein the second code is set in such a manner that a range of the value of the first code corresponds to a range of the target voltage level of the output voltage.

5. The voltage converter of claim 3, wherein the delay controller comprises first and second inverting circuits coupled to each other to output the delayed clock signal by delaying the reference clock signal, and
    wherein bias currents flowing through the first and second inverting circuits are controlled according to the output voltage.

6. The voltage converter of claim 5, wherein the delay controller further comprises a first delay control section configured to control the delay amount of the delayed clock signal according to the first code.

7. The voltage converter of claim 6, wherein the second code includes a first calibration code and a second calibration code, and
    wherein the delay controller further comprises a second delay control section configured to control the delay amount of the delayed clock signal according to the first calibration code.

8. The voltage converter of claim 7, wherein the delay controller further comprises a third delay control section configured to control the delay amount of the delayed clock signal according to the first code and a second calibration code.

9. The voltage converter of claim 2, wherein the clock signal comprises a third signal, and
    wherein the third signal has a first level during a first period in which a phase of the reference clock signal leads a phase of the delayed clock signal, and has a second level during a second period in which the phase of the delayed clock signal leads the phase of the reference clock signal.

10. The voltage converter of claim 9, wherein the clock signal further comprises a first signal including a plurality of pulses in the first period and a second signal including a plurality of pulses in the second period.

11. The voltage converter of claim 10, wherein the phase detector comprises:
    an edge detection section configured to output first and second phase signals which transition at edges of the reference clock signal and the delayed clock signal;
    an amplification section configured to amplify a difference between the first and second phase signals and output first and second amplified signals; and
    a signal generation section configured to generate the first signal, the second signal, and the third signal according to the first and second amplified signals.

12. The voltage converter of claim 11, wherein the signal generation section comprises:
    a first signal generator configured to be driven by the first amplified signal and output the first signal;
    a second signal generator configured to be driven by the second amplified signal and output the second signal; and
    a third signal generator configured to output the third signal according to the first and second amplified signals.

13. The voltage converter of claim 11, wherein the phase detector further comprises a reset section configured to detect a phase difference between the reference clock signal and the delayed clock signal and reset the first and second amplified signals.

14. The voltage converter of claim 10, wherein the frequency adjustor comprises:
    a delay addition section configured to determine a pulse generation time according to a reference value, output a first pulse signal in the first period, and output a second pulse signal in the second period;
    a frequency error detection section configured to control the reference value according to the number of pulses of the first signal in the first period and the number of pulses of the second signal in the second period; and
    a signal synthesis section configured to output the control signal based on the first and second pulse signals.

15. The voltage converter of claim 14, wherein the delay addition section comprises:
    a first counter configured to calculate the number of pulses of the first signal in the first period;
    a second counter configured to calculate the number of pulses of the second signal in the second period;
    a first comparator configured to output the first pulse signal having a pulse when an output value of the first counter is equal to the reference value; and a second comparator configured to output the second pulse signal having a pulse when an output value of the second counter is equal to the reference value.

16. The voltage converter of claim 14, wherein the frequency error detection section comprises:
a third counter configured to calculate the number of pulses of the first signal in the first period and the number of pulses of the second signal in the second period; and
a fourth counter configured to adjust the reference value according to an output of the third counter.

17. The voltage converter of claim 16, wherein the fourth counter compares the output of the third counter to a predetermined value and increases or decreases the reference value according to the comparison result.

18. The voltage converter of claim 14, wherein the signal synthesis section comprises a latch circuit configured to generate rising and falling edges of the control signal according to the first pulse signal and the second pulse signal.

19. The voltage converter of claim 1, wherein the control signal comprises a pulse width modulation (PWM) clock signal.

20. The voltage converter of claim 19, the power supply circuit comprises a buck converter.

* * * * *